(12) United States Patent
Setina

(10) Patent No.: US 9,883,743 B2
(45) Date of Patent: Feb. 6, 2018

(54) FIREARM LOCK SHROUD

(71) Applicant: Terry L. Setina, Olympia, WA (US)

(72) Inventor: Terry L. Setina, Olympia, WA (US)

(*) Notice: Subject to any disclaimer, the term of this patent is extended or adjusted under 35 U.S.C. 154(b) by 0 days.

(21) Appl. No.: 15/162,434

(22) Filed: May 23, 2016

(65) Prior Publication Data
US 2017/0332783 A1    Nov. 23, 2017

(51) Int. Cl.
*A47B 81/00* (2006.01)
*B60R 7/14* (2006.01)
*F41A 17/46* (2006.01)

(52) U.S. Cl.
CPC .............. *A47B 81/005* (2013.01); *B60R 7/14* (2013.01); *F41A 17/46* (2013.01)

(58) Field of Classification Search
CPC ......... A47B 81/005; B60R 7/14; F41A 23/00; F41A 17/46
See application file for complete search history.

(56) References Cited

U.S. PATENT DOCUMENTS

| | | | |
|---|---|---|---|
| 5,138,786 A * | 8/1992 | Fischer | F41A 17/02 |
| | | | 211/64 |
| 5,791,499 A * | 8/1998 | Zebbedies | B60R 7/14 |
| | | | 211/64 |
| 6,330,815 B1 * | 12/2001 | Duncan | B60R 7/14 |
| | | | 211/4 |
| 6,438,885 B1 * | 8/2002 | Murray | F41A 17/54 |
| | | | 211/64 |
| 7,047,771 B2 * | 5/2006 | Tanos | E05B 15/0046 |
| | | | 211/64 |
| 8,266,835 B2 * | 9/2012 | Pintar | F41A 17/02 |
| | | | 42/70.06 |
| 8,950,596 B2 * | 2/2015 | Arabian | B60R 7/14 |
| | | | 211/64 |
| 9,010,007 B2 * | 4/2015 | Chandler | F41A 17/04 |
| | | | 206/315.11 |
| 9,482,482 B1 * | 11/2016 | Sanders | E05B 73/00 |
| 9,534,867 B2 * | 1/2017 | Dunn | F41C 33/06 |
| 2016/0238337 A1 * | 8/2016 | Hull | B60R 7/14 |

* cited by examiner

*Primary Examiner* — Stephen Johnson
*Assistant Examiner* — Joshua T Semick
(74) *Attorney, Agent, or Firm* — Klarquist Sparkman, LLP

(57) ABSTRACT

A firearm lock shroud for a firearm lock comprises first and second side members. The first side member is positioned adjacent the firearm lock. The second side member is positioned adjacent the firearm lock and spaced apart from the first side member. The first and second side members define a firearm receiving space therebetween for receiving a firearm. The first and second side members extend over an area to cover at least a trigger area of a firearm received in the firearm receiving space and locked by the firearm lock to prevent unauthorized access to the trigger area. The side members can optionally extend to cover a magazine area and/or a take-down pin area of the firearm.

17 Claims, 14 Drawing Sheets

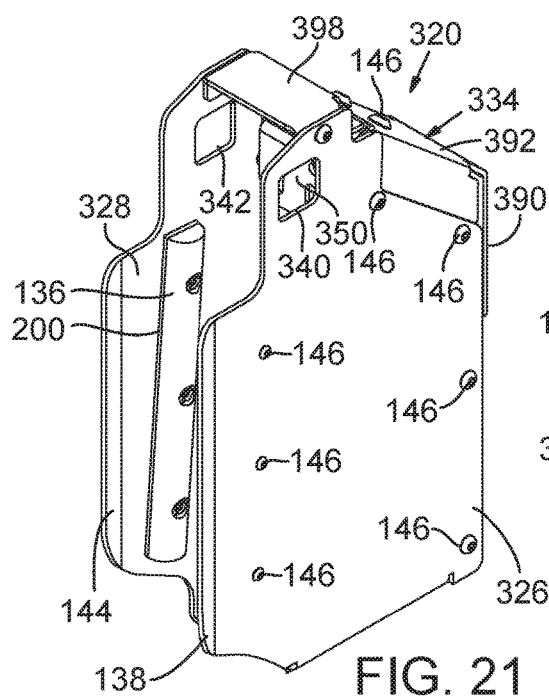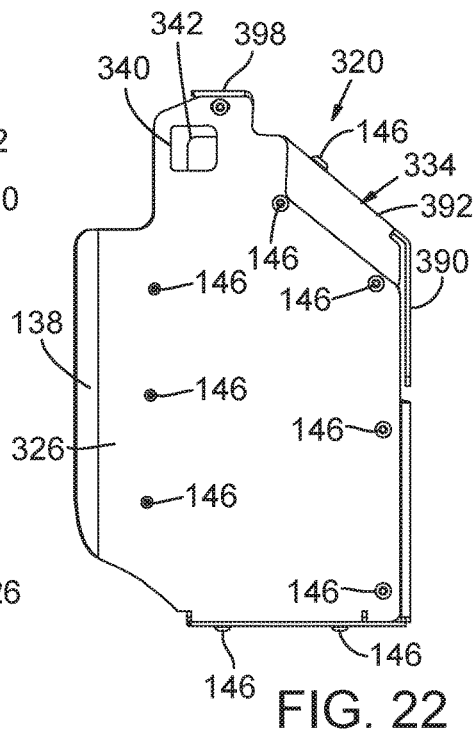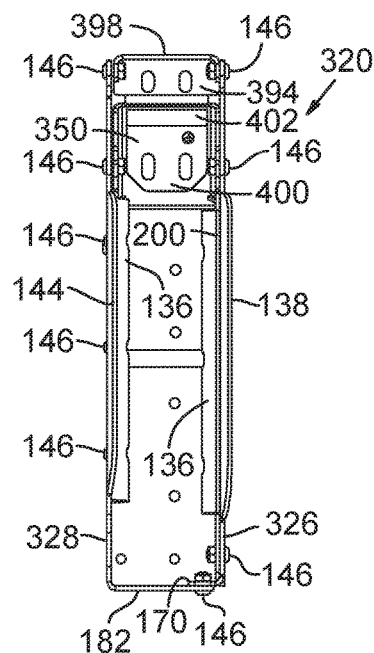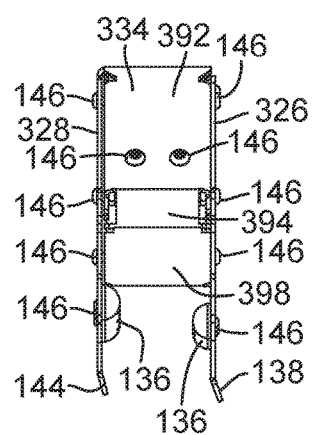
FIG. 21
FIG. 22
FIG. 23
FIG. 24

FIREARM LOCK SHROUD

BACKGROUND

This application relates to firearm storage, and in particular to a shroud that provides additional security to a locked firearm.

Providing secure storage for a firearm in a manner that allows it to be accessed quickly by an authorized user, yet prevents access by others, continues to pose a challenge. This is especially true for law enforcement officers. Officers often prefer to have their firearms, and especially rifles and shotguns, locked and stored in the passenger compartments of their vehicles. In this way, rifles and shotguns are readily available to the officers upon arriving at a scene, which provides advantages over needing to retrieve them from a rear trunk or cargo area. But the passenger compartments of law enforcement vehicles are also used to transport prisoners. Prisoners may need to be left unattended in a law enforcement vehicle, in close proximity to one or more locked firearms, while officers respond to a situation. Vehicle-mounted firearm racks with locks for securing firearms are known. But some firearms are susceptible to damage, tampering or other unauthorized activity, even while locked in a rack.

SUMMARY

Described below are implementations of a firearm shroud that addresses potential problems with conventional firearm locks.

According to a first implementation, a firearm lock shroud for a firearm lock comprises a first side member and a second side member. The first side member is positionable adjacent the firearm lock. The second side member is positionable adjacent the firearm lock and spaced apart from the first side member. The first and second side members define a firearm receiving space therebetween for receiving a firearm. The first and second side members extend over an area to cover at least a trigger area of a firearm received in the firearm receiving space and locked by the firearm lock to prevent unauthorized access to the trigger area.

In some implementations, the first and second side members extend to cover a take-down pin area of the firearm received in the firearm receiving space to prevent unauthorized access to a take-down pin for the firearm.

In some implementations, the first and second side members extend to cover a magazine area of the firearm received in the firearm receiving space to prevent unauthorized access to a magazine for the firearm.

In some implementations, the firearm lock shroud comprises a bracket connected to the first side member and to the second side member, and the bracket defines mounting holes and/or a mounting surface for mounting the firearm lock. In some implementations, the bracket defines rear and upper surfaces when the firearm lock shroud is in an installed position.

In some implementations, the shroud is adjustably positionable in at least a vertical direction by fasteners adjustably coupling the shroud to a stationary track.

In some implementations, the firearm lock shroud comprises an anti-lift bracket that extends from one end positioned at the first side member, over the firearm lock and to a second end positioned at the second side member.

In some implementations, the firearm lock shroud comprises an anti-lift bracket tab adjustably coupled to the anti-lift bracket, wherein the anti-lift bracket tab is adjustably positionable to contact a firearm with the firearm lock in the locked position around a firearm within the firearm receiving space.

In some implementations, the firearm lock shroud comprises at least one spacer member mounted to an inner surface of at least one of the first side member or the second side member.

The foregoing and other objects, features, and advantages of the invention will become more apparent from the following detailed description, which proceeds with reference to the accompanying figures.

BRIEF DESCRIPTION OF THE DRAWINGS

FIGS. 21-24 are perspective, side elevation, front elevation and top plan views, respectively, of the firearm lock shroud of FIG. 20.

DETAILED DESCRIPTION

Described below are embodiments of a firearm lock shroud and associated vehicle firearm lock assembly typically used in a vehicle.

Figure 1A:
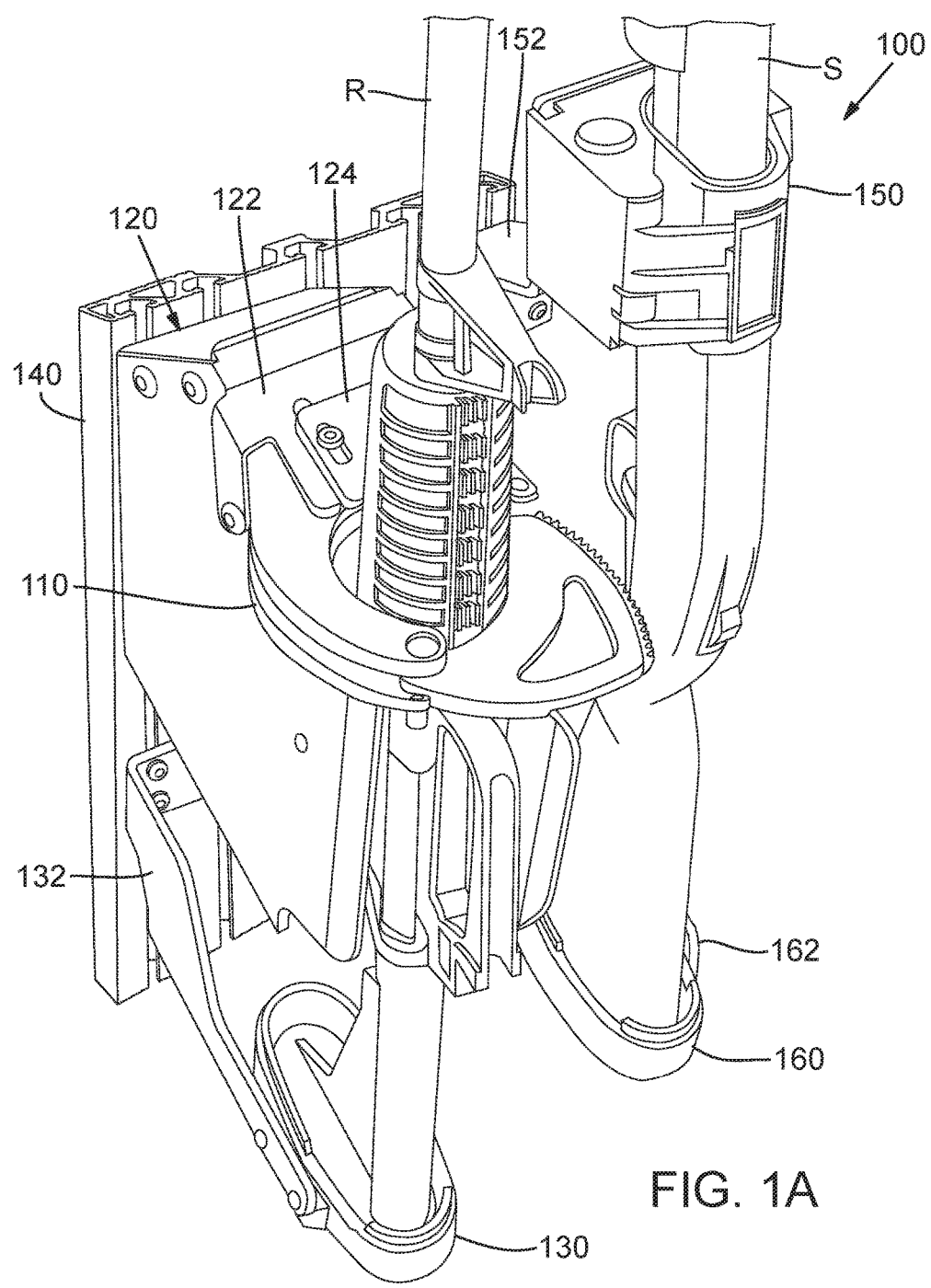
FIG. 1A is a perspective view of a firearm lock assembly for two firearms and having a firearm lock shroud for one of the two firearms.
Figure 1B:
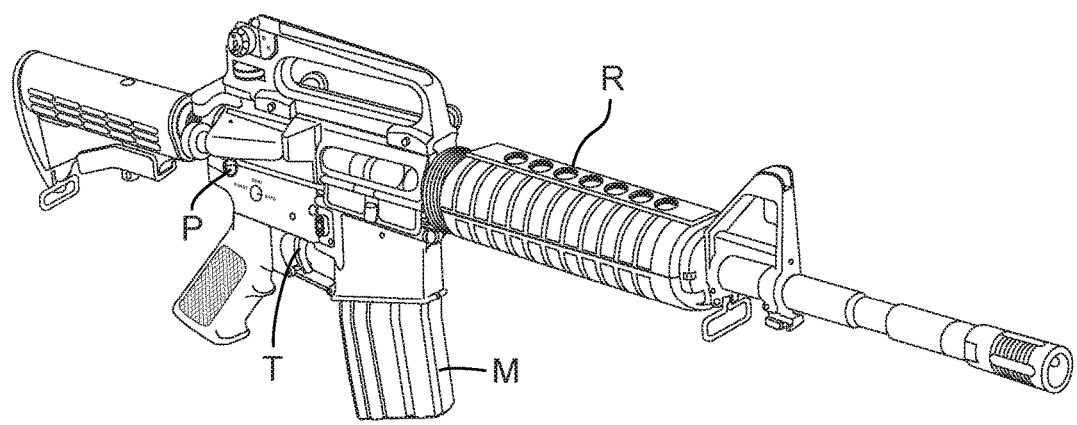
FIG. 1B is a perspective view of an exemplary firearm that can be stored and locked within the firearm lock assembly of FIG. 1.

Referring to FIG. 1A, in a first vehicle fire arm lock assembly 100, a rifle R is secured in an upright position with a lock 110. The lock 110 contacts or extends around the rifle R in the region of its forearm. A new guard or shroud 120 is positioned adjacent the lock and configured to prevent tampering with the rifle R, including when the rifle R is in its stored and locked position as shown. In the illustrated implementation, the shroud 120 extends along the rifle R to cover one or more its trigger T, takedown pin P and magazine M (FIG. 1B). The shroud 120 extends along both sides of the rifle R, as well as in the area between the lock 110 and a rail 140 to which the shroud and lock are adjustably coupled, as described below in greater detail. The lock 110 is sometimes referred to as a Universal Lock.

A butt of the rifle R is received in a butt holder 130. The butt holder 130 is supported by a butt holder bracket 132, which is also adjustably coupled to the rail 140. As also shown in FIG. 1, there is a shotgun S secured in an upright position by a second lock 150, which is attached by a second lock bracket 152 to the rail 140. A butt of the shotgun S is received in a second butt holder 160, which is supported by a second butt holder bracket 162. The rail 140 can have one or more tracks to receive fasteners for adjustably coupling components.

Referring again to the shroud 120 for the rifle R, there is an anti-lift bracket base 122 and an anti-lift bracket tab 124 that is coupled to the anti-lift bracket base 122. The anti-lift bracket base 122 and anti-lift bracket tab 124 are adjustably positioned to contact or cooperate with the rifle R, such as to eliminate excess play when the rifle R is positioned as shown in FIG. 1A with the lock 110 in the locked position. Specifically, the anti-lift bracket base and anti-lift bracket tab can be moved laterally to contact the rifle R or otherwise prevent it from being lifted, manipulated and/or rotated.

Figure 1C:
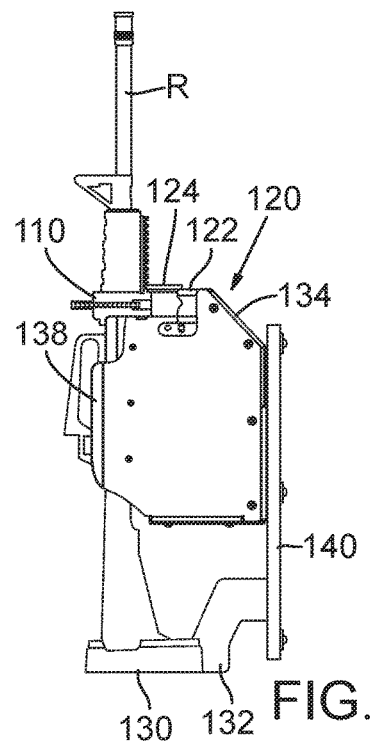
FIG. 1C is a side elevation of the firearm in the firearm lock assembly (with the second firearm removed for clarity).
Figure 1E:
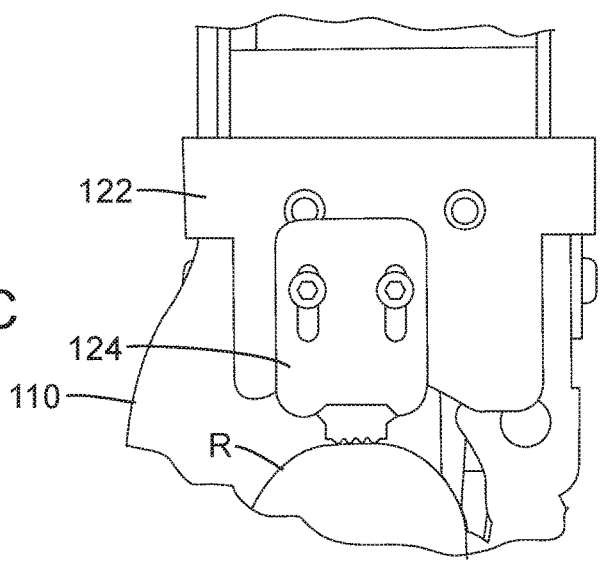
FIG. 1E is a top plan view of the approximate portion of the assembly shown in FIG. 1D.
Figure 1D:
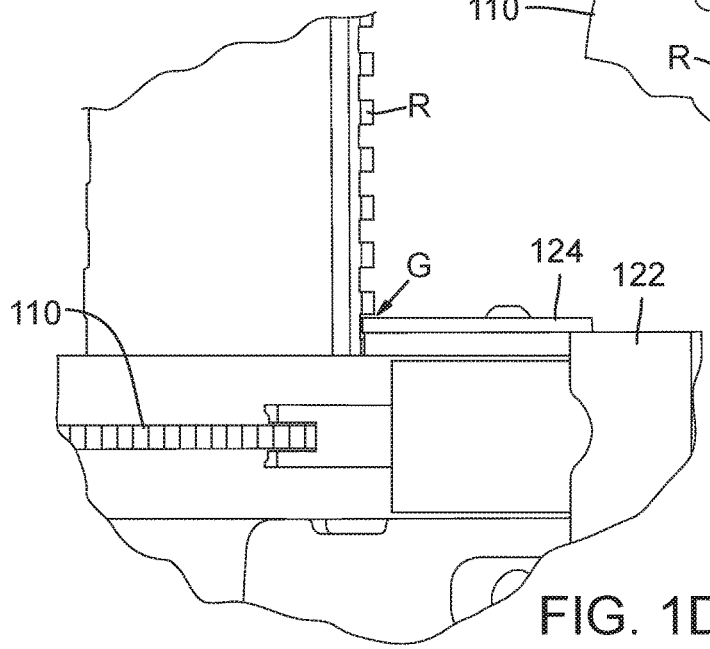
FIG. 1D is a magnified view of a portion of the assembly shown in FIG. 1C.

In a specific implementation, the anti-lift bracket tab 124 can be positioned so that it is received in a groove G or recess of the firearm R. A side elevation view of the rifle R received and locked in the shroud 120 is shown in FIG. 1C. FIG. 1D is a magnified view of a portion of FIG. 1C in elevation showing the anti-lift bracket tab 124 positioned above the lock 110 and to extend into a groove G in the forearm area of the rifle R. FIG. 1E shows a top plan view of approximately the same portion as FIG. 1D. As can be seen from the close fit between the anti-lift bracket tab 124 and the groove G, the rifle R cannot be displaced vertically relative to the lock 110 by any appreciable distance, and thus is more secure from tampering efforts.

Any suitable recess on the rifle R can serve as the groove G. In the illustrated implementation, the groove G is one of a series of grooves formed in an accessories rail with which the firearm R is typically equipped (FIGS. 1C and 1D). In other implementations, the shroud and lock assembly can be configured oppositely, i.e., the assembly can have a groove or recess configured to receive a corresponding protrusion on the firearm R.

Figure 2:
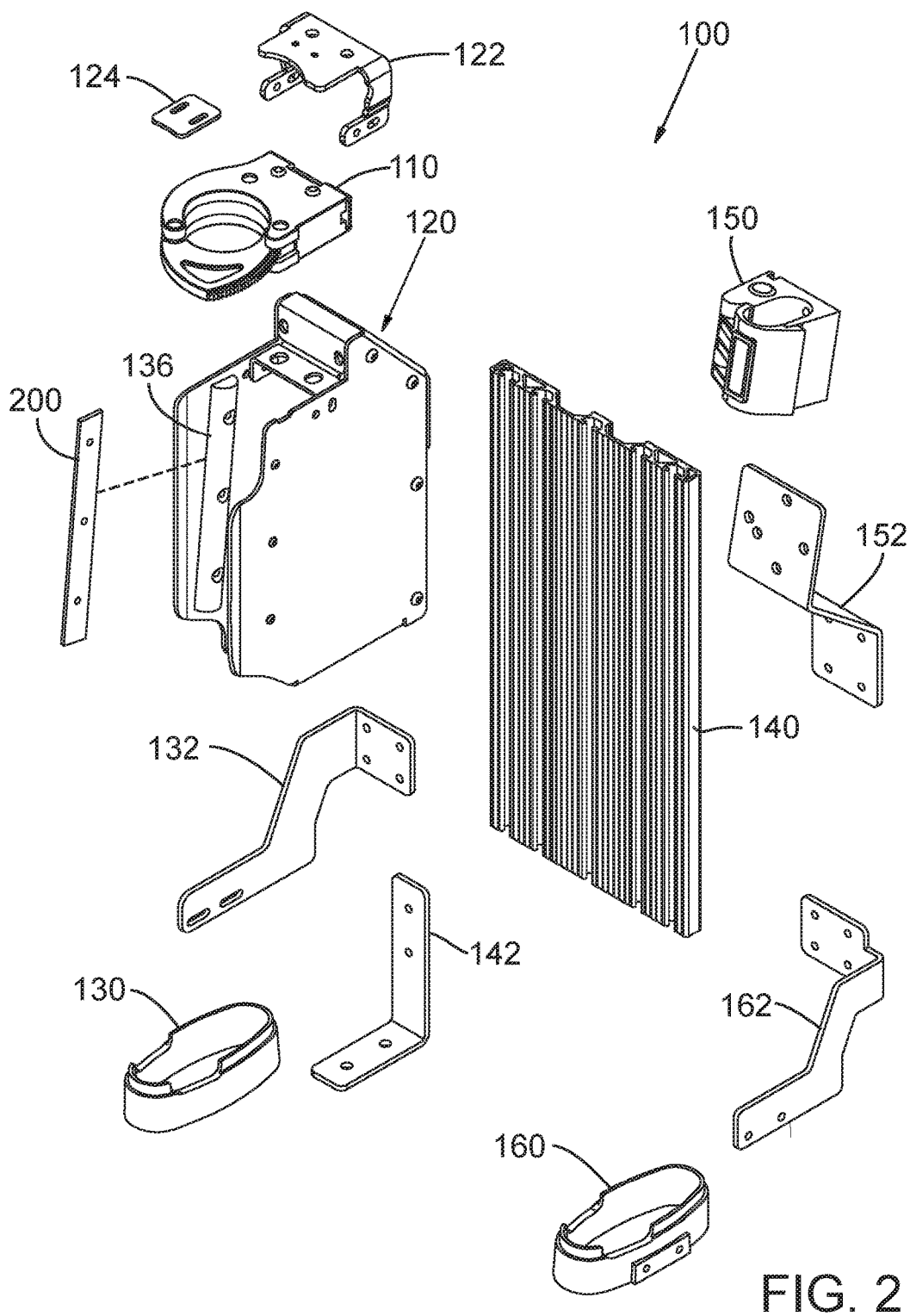
FIG. 2 is an exploded perspective view of the firearm lock assembly of FIG. 1A with the two firearms omitted for clarity.
Figure 3:
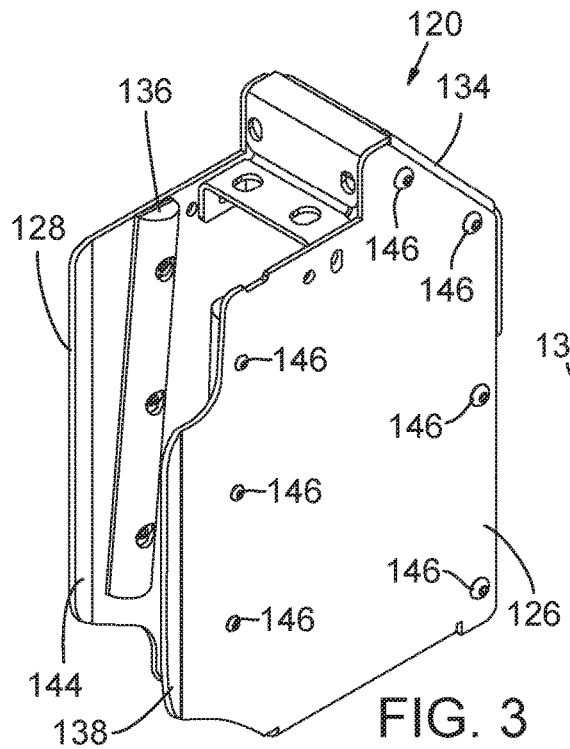
FIGS. 3-6 are perspective, side elevation, front elevation and top plan views, respectively, of the firearm lock shroud.
Figure 4:
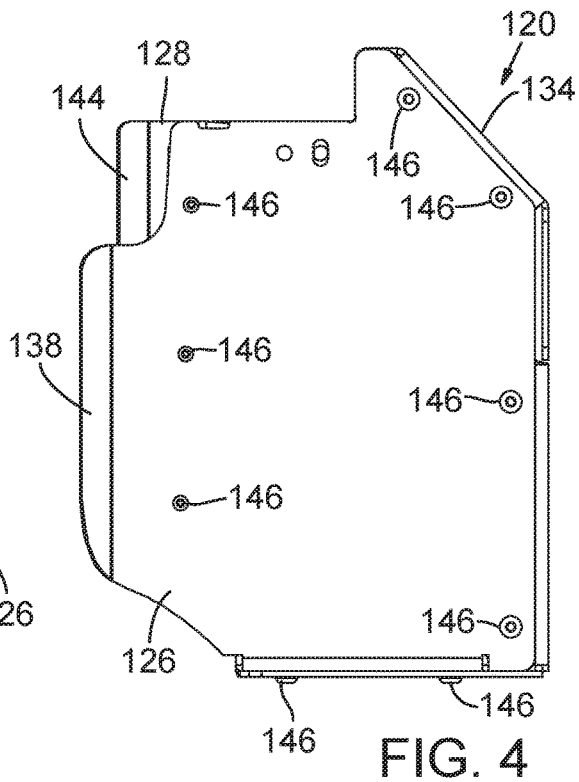
Figure 5:
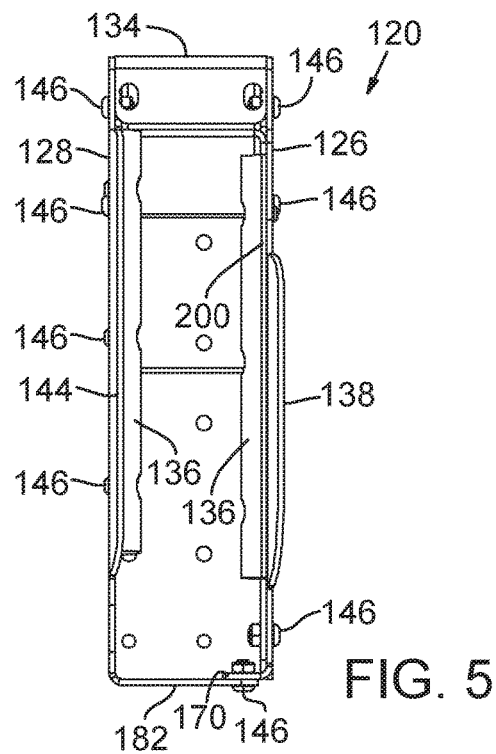
Figure 6:
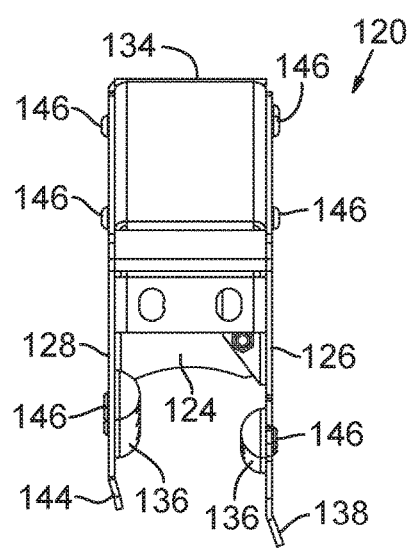

FIG. 2 is an exploded perspective view of the vehicle firearm lock assembly 100 of FIG. 1, except that the rifle R and the shotgun S have been omitted for clarity. FIGS. 3-11 are additional views of the shroud and its components.

Referring to FIGS. 2-11, the shroud 120 has a first side member 126 and an opposite second side member 128 spaced apart from the side member 126. In the illustrated implementations, there is an upper bracket 134 that serves to space the side members 126, 128 apart from each other by a desired dimension, e.g., a space sized to receive a selected rifle or other firearm. The side members 126, 128 can be coupled to the upper bracket 134 with fasteners 146. At least some of the fasteners 146 can be tamper-resistant fasteners, which are defined herein to include fasteners having an uncommon or proprietary head configuration.

The shroud 120 can have optional spacers 136 mounted along one or more internal surfaces to help guide the rifle into position when it is being inserted into the shroud and to protect the rifle from damage, e.g., such as scratches and/or other damage. In the illustrated implementations, the side member 126 has a bent outward tab 138, and the side member 128 has a bent inward tab 144. The tabs 138, 144 define an opening into which the rifle R is inserted. The tabs and other structure defining the leading edges of the opening can be modified to suit the particular requirements of the location of the vehicle firearm lock assembly and/or the rifle R, such as where the assembly is mounted and what other structural elements may be present, as well as other circumstances.

Figure 7:
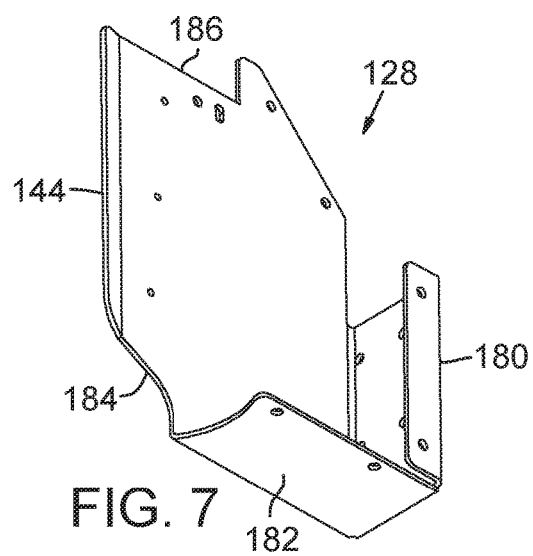
FIG. 7 is a perspective view of a first side member of the firearm lock shroud.
Figure 8A:
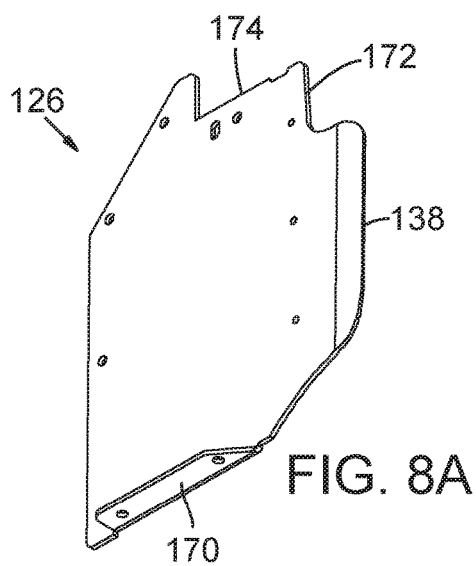
FIG. 8A is a perspective view of a second side member of the firearm lock shroud.
Figure 8B:
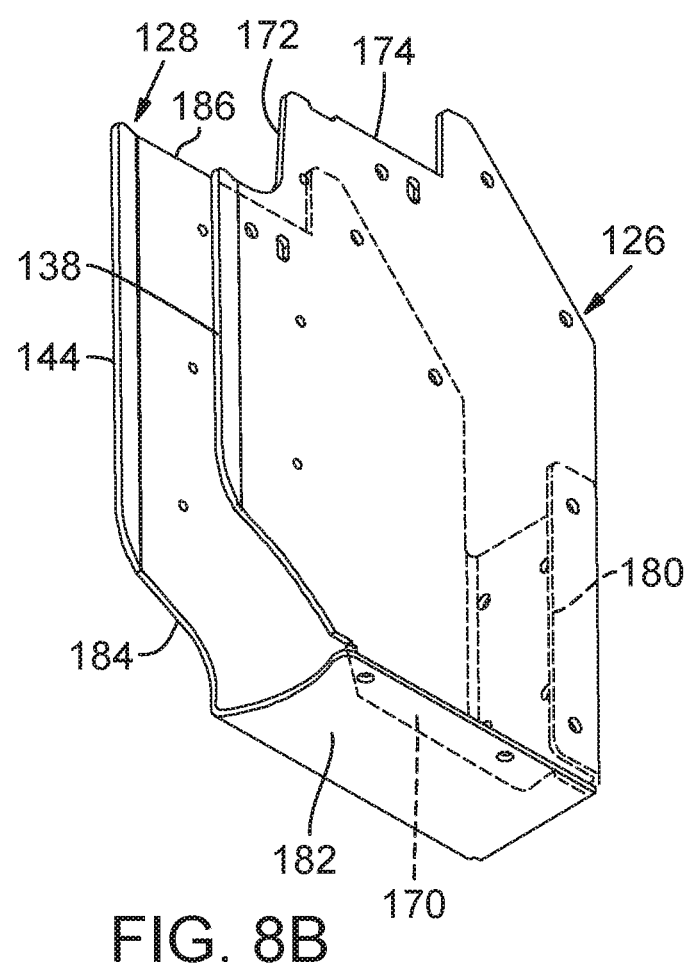
FIG. 8B is a perspective view of the first and second side members assembled together.

As shown in FIGS. 7, 8A and 8B, the side members 126, 128 can be formed from separate components that are joined together. Referring to FIG. 7, the side member 128 can be formed with a back flange 180 and a base flange 182 that extend approximately perpendicular to the side member's major inner and outer surfaces at the leading edge of the side member 128, and adjacent the bent inward tab 144, there can be a curved edge 184 extending from an area of the base flange 182 to the bent inward tab 144. In addition, the side member 128 can be formed with a notch 186.

The side member 126 can be formed with a base flange 170 extending approximately perpendicular to the major inner and outer surfaces of the side member 126. The side member 126 can have a recessed edge 172 adjacent an upper end of the bent outward tab 138. The recessed edge 172 can join a notch 174 as shown.

Figure 9:
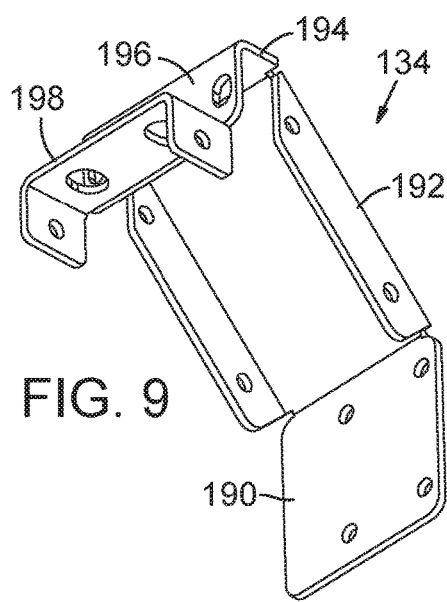
FIG. 9 is a perspective view of an upper bracket of the firearm lock shroud.

Referring to FIG. 9, the upper bracket 134 that is shaped to fit between the side members 126, 128 can have a back flange 190, an angled flange 192, an upper flange 194, a mounting flange 196 and a perpendicular mounting flange 198. As best shown in FIG. 2, various types of firearm locks, including the lock 110, can be secured to the upper bracket 134 at the mounting flange 196 and/or the mounting flange 198, e.g., using fasteners, including tamper-resistant fasteners as discussed above.

Figure 10:
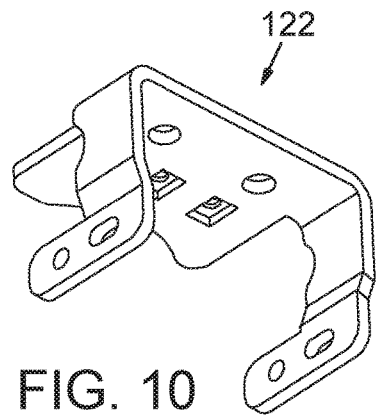
FIG. 10 is a perspective view of an anti-lift bracket base of the firearm lock shroud.
Figure 11:
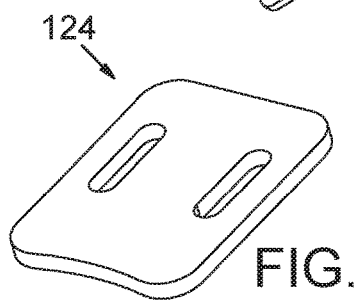
FIG. 11 is a perspective view of an anti-lift bracket tab of the firearm lock shroud.

FIG. 10 is a perspective view of the anti-lift bracket base 122, and FIG. 11 is a perspective view of the associated anti-lift bracket tab 124. As best seen in FIGS. 1 and 2, the anti-lift bracket base 122 is positioned to surround the firearm lock 110 on three of its sides and to be attached to the side member 126 and side member 128 with fasteners. As also described above, the anti-lift bracket tab 124 is adjustably coupled to the anti-lift bracket base 122 such that it can be positioned to contact the rifle R and to prevent the rifle R from being lifted when it is in the secured and locked positioned within the firearm lock 110 as best shown in FIG. 1.

Figure 12:
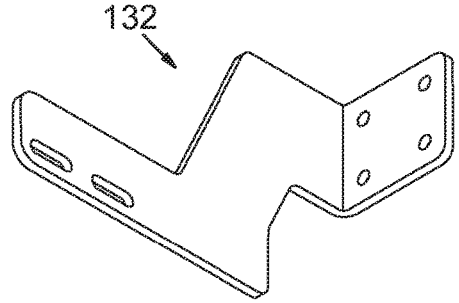
FIG. 12 is a perspective view of a butt holder bracket.
Figure 13:
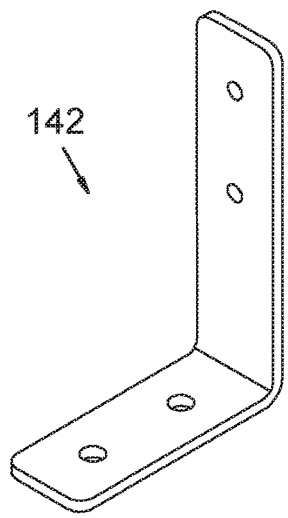
FIG. 13 is a perspective view of a rail floor bracket.
Figure 14:
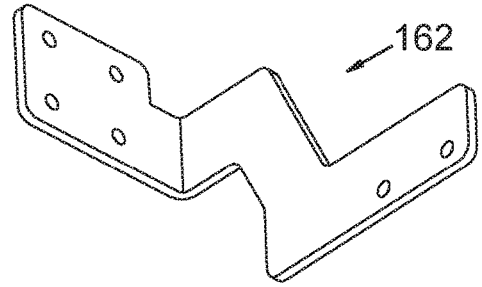
FIG. 14 is a perspective view of a second butt holder bracket.
Figure 15B:
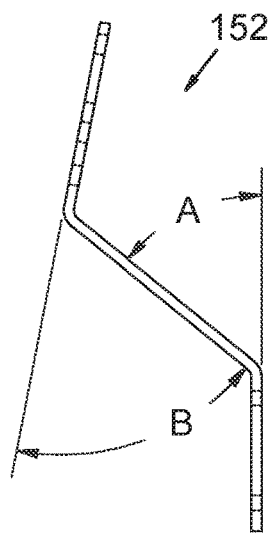
FIGS. 15A and 15B are perspective and side elevation views of a second lock bracket.
Figure 15A:
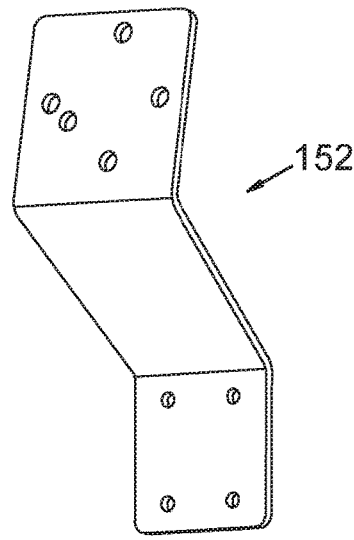

FIG. 12 is a perspective view of the butt holder bracket 132. FIG. 13 is a perspective view of a rail floor bracket 142, also shown in FIG. 2, with which the rail 140 can be secured, such as to a floor of the vehicle. FIG. 14 is a perspective view of a second butt holder bracket 162. FIGS. 15A and 15B are perspective and side views of a second lock bracket 152 by which the second lock 150 is secured to the rail 140. The rail 140 has a series of slots along with the various components can be adjustably positioned to allow for secure attachment and convenient reconfiguration according to the particular operating requirements.

Figure 16A:
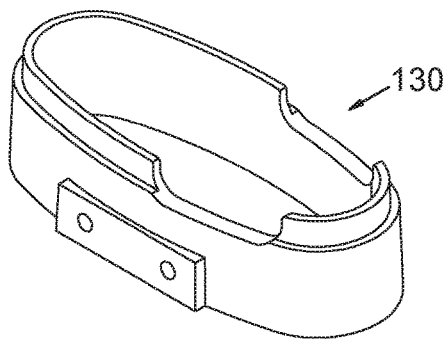
FIGS. 16A, 16B and 16C are perspective, top plan and side elevation views of a first butt holder.
Figure 16B:
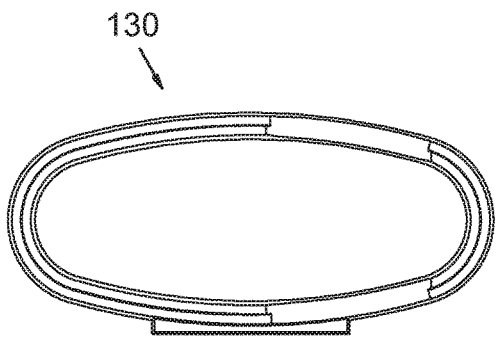
Figure 16C:
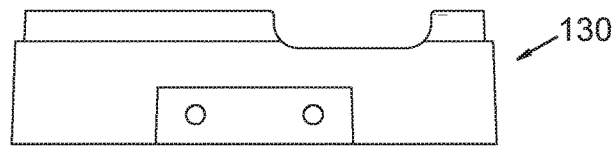
Figure 17A:
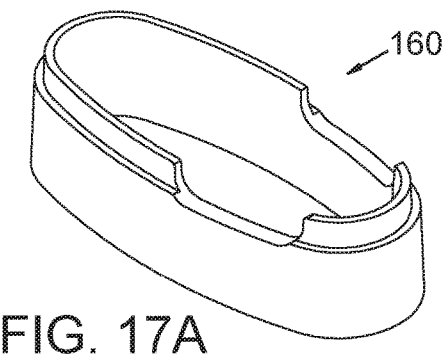
FIGS. 17A, 17B and 17C are perspective, top plan and side elevation views of a second butt holder.
Figure 17B:
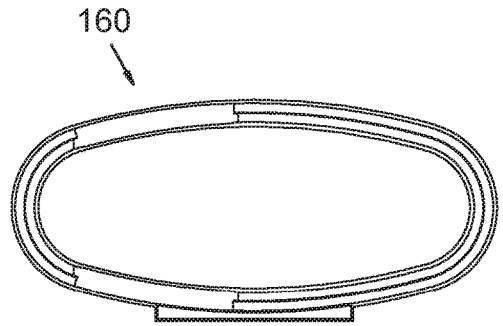
Figure 17C:
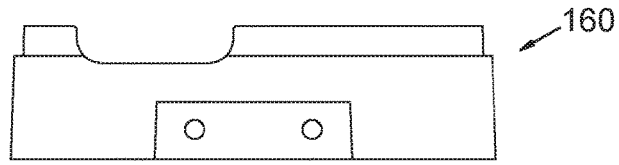

FIGS. 16A, 16B and 16C are perspective, plan and side elevation views, respectively, of the butt holder 130. FIGS. 17A, 17B and 17C are perspective, top plan and side elevation views, respectively, of the second butt holder 160.

Figure 18A:
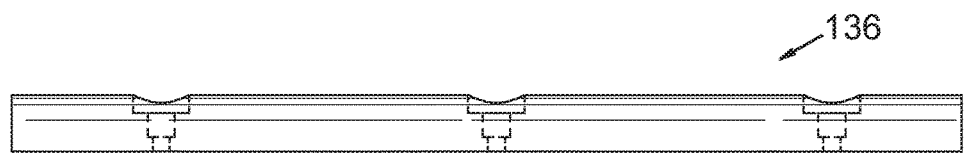
FIGS. 18A, 18B and 18C are side elevation, top plan and end elevation views of a spacer.
Figure 18B:
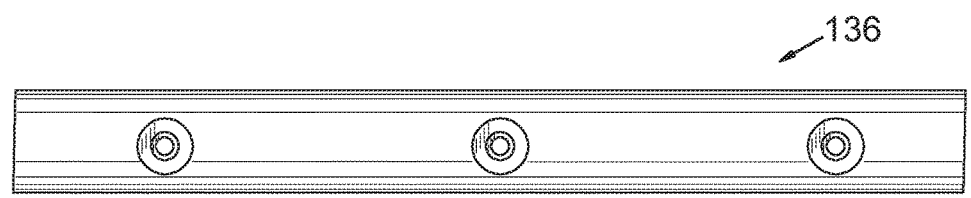
Figure 18C:

FIGS. 18A, 18B and 18C are side elevation, top plan and end elevation views, respectively, of the spacer 136. The spacer may be constructed of a plastic or other similar material that is smooth, has low friction and tends not to damage firearms. In a specific implementation, the spacer is made of DELRIN or a similar material.

Figure 19:
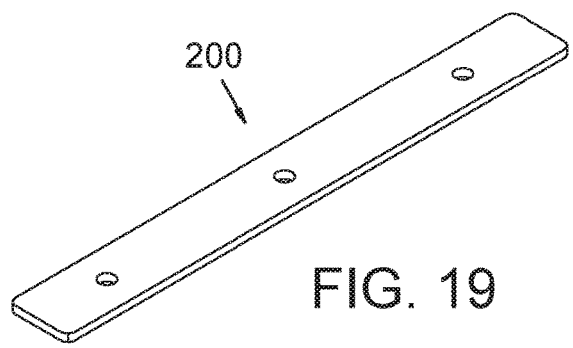
FIG. 19 is a perspective view of a filler plate.

FIG. 19 is a perspective view of a filler plate 200. As shown in FIG. 2, one or more filler plates can be used to adjust the fit of the spacer 136 so that it makes contact with the firearm as desired when the firearm is received in the shroud. In some implementations, a filler plate is used to prevent undesired side-to-side motion of the firearm while it is stored in the shroud.

Figure 20:
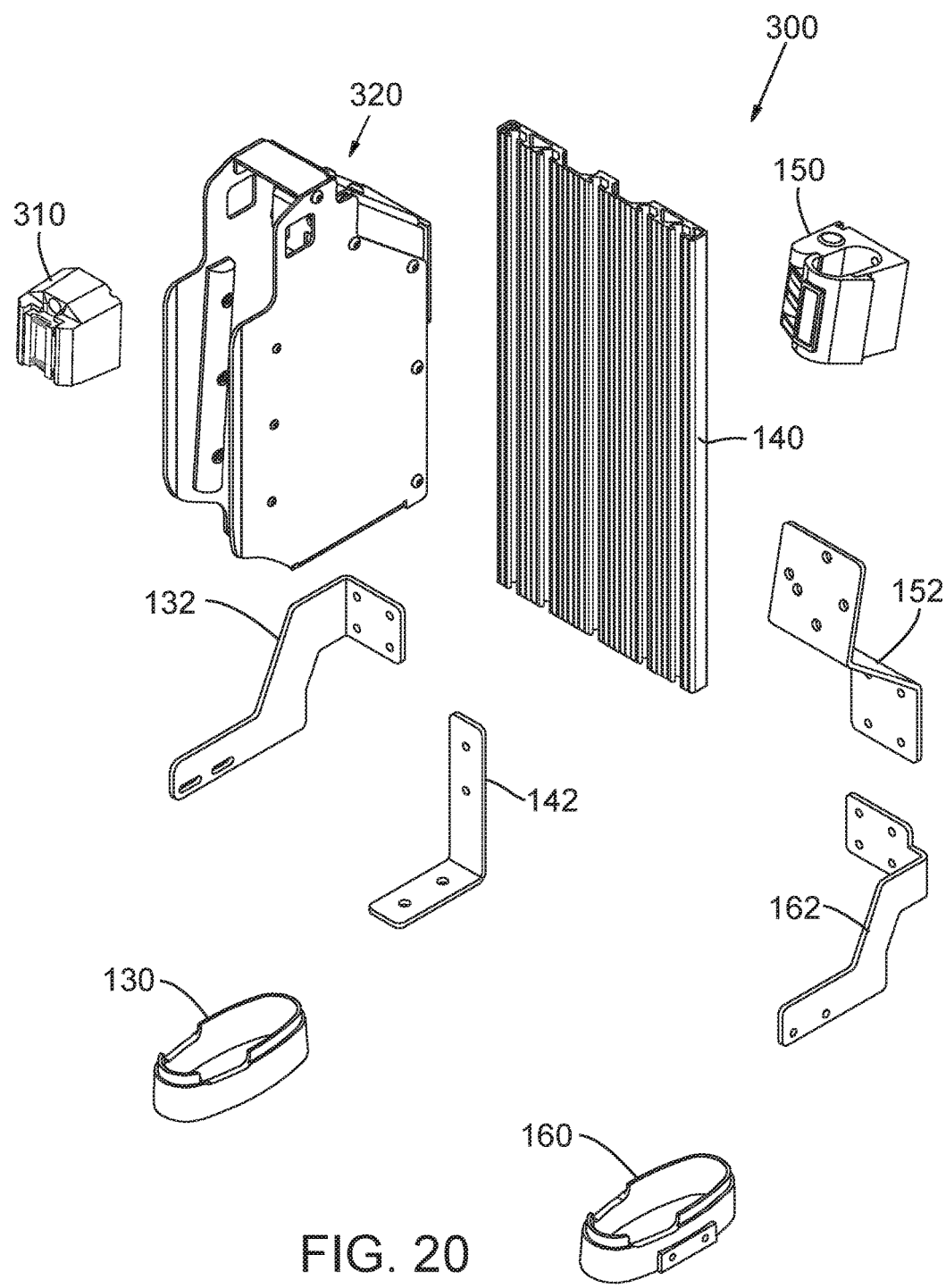
FIG. 20 is an exploded perspective view of a firearm lock assembly having a modified firearm lock shroud.
Figure 25:
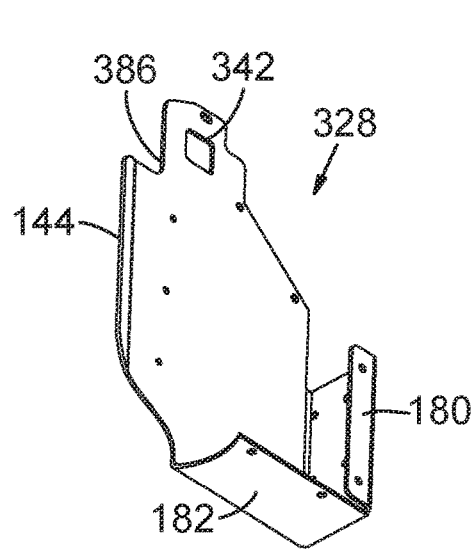
FIG. 25 is a perspective view of a first side member of the firearm lock shroud of FIG. 20.
Figure 26:
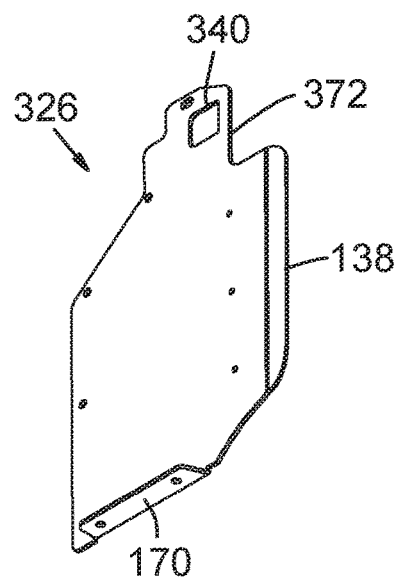
FIG. 26 is a perspective view of a second side member of the firearm lock shroud of FIG. 20.
Figure 27:
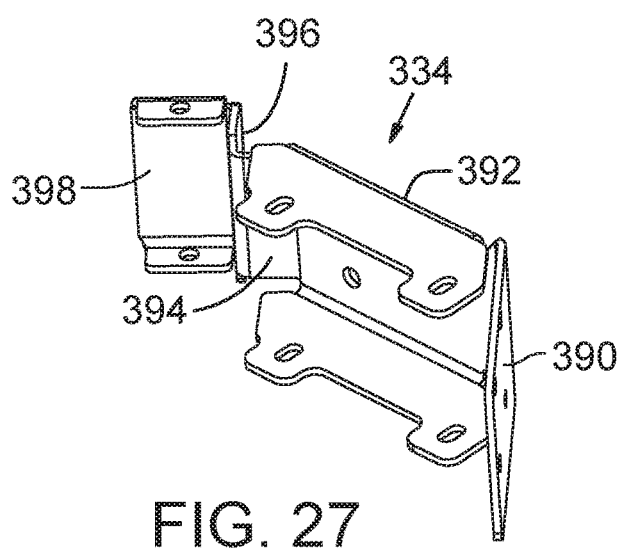
FIG. 27 is a perspective view of an upper bracket of the firearm lock shroud of FIG. 20.

FIG. 20 is a perspective view of another vehicle firearm lock assembly 300 that is similar to the vehicle firearm lock assembly 100 except that a lock 310 of a different type and a corresponding different shroud 320 are shown. The components that are identical to those already described are shown with the same reference numeral. The lock 310 is referred to as a Rail Lock and is typically configured to interact with a rail of the firearm 9 or other recess or protruding feature) in order to lock the firearm securely in place.

Referring to FIGS. 20-26, 29 and 30, the shroud 320 has a side member 326 and a side member 328 spaced apart from the side member 326. As shown in FIGS. 21 and 22, the side member 328 has an opening 342, and the side member 326 has a corresponding opening 340. The opening 340 or the opening 342 can be used as a manual lock override access opening, e.g., in the case of a lost key or a damaged lock.

Figure 28:
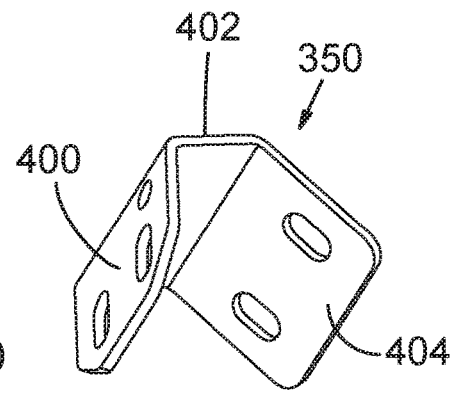
FIG. 28 is a perspective view of a bracket support of the firearm lock shroud of FIG. 20.
Figure 29:
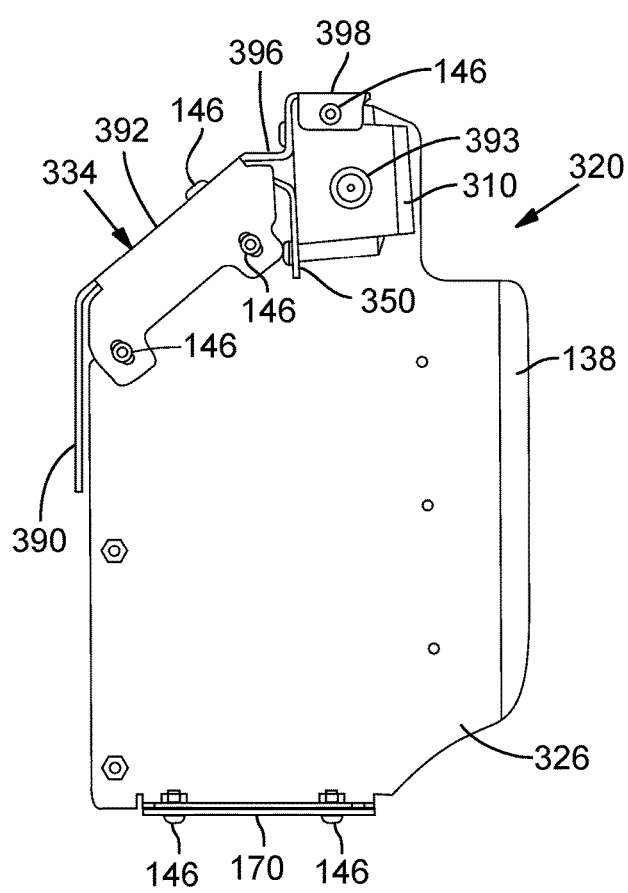
FIG. 29 is a side elevation view of the second side member of FIG. 26 with a firearm lock, upper bracket and bracket support installed.
Figure 30:
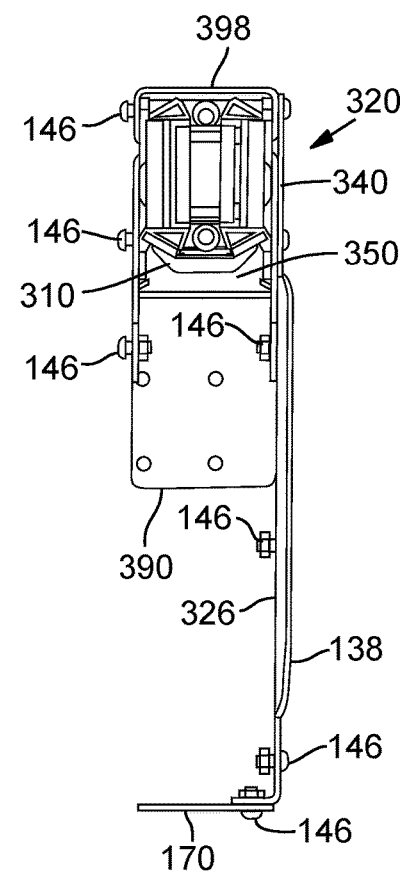
FIG. 30 is a top plan view of the second side member and other components of FIG. 29.

There is an upper bracket 334 to which the side member 326 and the side member 328 are attached. The upper bracket 334 has a back flange 390, an angled flange 392, an upper flange 394, a mounting flange 396 and a mounting flange 398, as also shown in FIGS. 21-24. At its upper end, the lock 310 is mounted to the upper bracket 334 (FIGS. 28-30), such as with tamper-proof fasteners. At its lower end, the lock 310 is mounted to a bracket support 350, which is in turn mounted to the upper bracket 334, such as with tamper-proof fasteners. Referring to FIG. 28, the bracket support 350 has a mounting flange 400, a connecting flange 402 and a second mounting flange 404. As best shown in FIGS. 29 and 30, the bracket support 350 is mounted to the upper bracket 334 to position the lock 310 as shown. In an alternative implementation, the upper bracket and bracket support are formed as a single piece.

The various structural components of the vehicle firearm lock assembly 100, 300, including the shroud 120, 320 can be made of any suitable materials, including, e.g., aircraft grade aluminum.

The shroud 120, 320 can be adapted for use with various firearms. In the illustrated implementation, the firearm is a M4 carbine or similar firearm, but the shroud can be adapted for use with other long arms, including other rifles as well as shot guns.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A firearm lock shroud for a firearm lock, comprising:
a first side member positionable adjacent the firearm lock;
a second side member positionable adjacent the firearm lock and spaced apart from the first side member, the first and second side members extending longitudinally and defining a firearm receiving space therebetween for receiving the firearm, wherein respective free ends of the first and second side members define a longitudinal opening therebetween in the firearm lock shroud through which a firearm can be inserted into and removed from the firearm receiving space, the longitudinal opening and firearm receiving space being sized to receive a narrow dimension of the firearm;
an anti-lift bracket that extends from one end positioned at the first side member, over the firearm lock and to a second end positioned at the second side member;
an anti-lift bracket tab adjustably coupled to the anti-lift bracket;
wherein the first and second side members are positioned to be closely spaced from respective opposite sides of at least a trigger area of a firearm received in the firearm receiving space and locked by the firearm lock to cover the trigger area and prevent unauthorized access to the trigger area, and
wherein the anti-lift bracket tab is adjustably positionable to contact a firearm with the firearm lock in a locked position around a firearm within the firearm receiving space.

2. The firearm lock shroud of claim 1, wherein the first and second side members extend to cover a magazine area of the firearm received in the firearm receiving space to prevent unauthorized access to a magazine for the firearm.

3. The firearm lock shroud of claim 1, further comprising a bracket connected to the first side member and to the second side member along at least a part of a rear side of the firearm receiving space, and wherein the bracket defines mounting holes for mounting the firearm lock.

4. The firearm lock shroud of claim 3, wherein the bracket defines rear and upper surfaces when the firearm lock shroud is in an installed position.

5. The firearm lock shroud of claim 1, wherein the firearm lock shroud is adjustably positionable in at least a vertical direction by fasteners adjustably coupling the shroud to a stationary track.

6. The firearm lock shroud of claim 1, wherein the first and second side members extend to cover a take-down pin area of the firearm received in the firearm receiving space to prevent unauthorized access to a take-down pin for the firearm.

7. The firearm lock shroud of claim 1, further comprising at least one spacer member mounted to an inner surface of at least one of the first side member or the second side member.

8. A firearm lock assembly for locking a firearm, comprising:
- a firearm lock;
- a firearm lock mount;
- a firearm lock shroud positioned adjacent the firearm lock, coupled to the firearm lock mount and having a first side member and a second side member, wherein the first side member and the second side member are spaced apart from each other to define a firearm receiving space therebetween for receiving a firearm, wherein respective free ends of the first and second side members define a longitudinal opening therebetween in the firearm lock shroud through which the firearm can be inserted into and removed from the firearm receiving space, the longitudinal opening and firearm receiving space being sized to receive a narrow dimension of the firearm;
- an anti-lift bracket that extends from one end positioned at the first side member, over the firearm lock and to a second end positioned at the second side member, and
- an anti-lift bracket tab adjustably coupled to the anti-lift bracket, wherein the anti-lift bracket tab is adjustably positionable to extend into contact with a firearm in the firearm receiving space and with the firearm lock in a locked position or to extend into a recess defined on the firearm;
- wherein the first and second side members extend longitudinally in a direction generally away from the firearm lock to cover at least a trigger area of a firearm received in the firearm receiving space and locked by the firearm lock to prevent unauthorized access to the trigger area.

9. The firearm lock assembly of claim 8, wherein the first and second side members extend to cover a take-down pin area of the firearm received in the firearm receiving space to prevent unauthorized access to a take-down pin for the firearm.

10. The firearm lock assembly of claim 8, wherein the first and second side members extend to cover a magazine area of the firearm received in the firearm receiving space to prevent unauthorized access to a magazine for the firearm.

11. The firearm lock assembly of claim 8, further comprising a bracket connected to the first side member and to the second side member, and wherein the bracket defines a mounting surface for the firearm lock.

12. The firearm lock assembly of claim 8, further comprising a second firearm lock for a second firearm, the second firearm lock being adjustably coupleable to the firearm lock mount.

13. The firearm lock assembly of claim 8, wherein the firearm lock mount comprises a rail configured for mounting to a vehicle, the rail comprising at least one track along which the firearm lock and firearm lock shroud can be adjustably positioned.

14. The firearm lock assembly of claim 8, further comprising at least one spacer member mounted to an inner surface of at least one of the first side member or the second side member.

15. The firearm lock assembly of claim 8, wherein the firearm lock shroud comprises a bracket, wherein the first and second side members and the firearm lock are coupleable to the bracket with fasteners.

16. The firearm lock assembly of claim 8, wherein the first and second side members have aligned openings, and wherein the firearm lock can be accessed through one of the aligned openings to override key operation of the lock.

17. The firearm lock shroud of claim 1, wherein the free ends of the first and second side members are bent.

* * * * *